(12) United States Patent
Hemming et al.

(10) Patent No.: US 7,179,029 B2
(45) Date of Patent: Feb. 20, 2007

(54) MACHINE FOR MACHINING WORKPIECES, ESPECIALLY CRANKSHAFTS AND CAMSHAFTS, WITH AT LEAST ONE INTERNAL CUTTER MILLING TOOL

(75) Inventors: Christoph Hemming, Engstingen (DE); Wolfgang Märker, Linsenhofen (DE); Heinrich Bonfert, Dettingen (DE)

(73) Assignee: Gebr. Heller Maschinenfabrik GmbH, Nürtingen (DE)

( * ) Notice: Subject to any disclaimer, the term of this patent is extended or adjusted under 35 U.S.C. 154(b) by 150 days.

(21) Appl. No.: 10/709,043

(22) Filed: Apr. 8, 2004

(65) Prior Publication Data
US 2004/0247408 A1 Dec. 9, 2004

(30) Foreign Application Priority Data
Apr. 11, 2003 (DE) ................................ 103 17 318

(51) Int. Cl.
B23C 3/06 (2006.01)
B23P 23/00 (2006.01)

(52) U.S. Cl. ................ 409/200; 409/166; 409/165; 409/134; 409/203; 409/213; 409/235; 29/27 R; 29/6.01; 82/106; 82/164; 82/149

(58) Field of Classification Search ........ 409/199–200, 409/143, 165–166, 134, 203, 213, 217, 235; 29/27 R, 27 C, 6.01, 888.08; 82/106, 164, 82/170, 149
See application file for complete search history.

(56) References Cited

U.S. PATENT DOCUMENTS

| 3,795,161 | A | * | 3/1974 | Berbalk ................. 82/106 |
| 4,171,654 | A | | 10/1979 | Kreucher |
| 4,180,359 | A | * | 12/1979 | Schmid .................. 409/199 |
| 4,208,156 | A | * | 6/1980 | Kralowetz et al. .......... 409/200 |
| 4,215,604 | A | * | 8/1980 | Blaimschein ................. 82/106 |
| 4,305,689 | A | | 12/1981 | Yamade et al. |
| 4,326,323 | A | * | 4/1982 | Kralowetz et al. ........... 29/6.01 |
| 4,375,670 | A | * | 3/1983 | Kralowetz et al. ............. 82/106 |
| 4,444,533 | A | * | 4/1984 | Riley et al. ................. 409/200 |
| 4,525,112 | A | * | 6/1985 | Blaimschein et al. ....... 409/199 |
| 4,679,973 | A | * | 7/1987 | Kodama et al. ............ 409/200 |
| 4,730,945 | A | * | 3/1988 | Luther et al. ................. 384/45 |
| 5,078,556 | A | | 1/1992 | Schrod et al. |
| 5,127,140 | A | * | 7/1992 | Oiwa et al. ................. 29/27 C |

(Continued)

FOREIGN PATENT DOCUMENTS

DE 10035718 A 2/2002

(Continued)

*Primary Examiner*—Erica Cadugan
(74) *Attorney, Agent, or Firm*—Gudrun E. Huckett

(57) ABSTRACT

A machine for machining workpieces has at least one milling tool with an internal cutter. The machine is provided with a first guide system and a second guide system parallel to the first guide system. The first guide system has at least one compound slide having a slide part, wherein the at least one compound slide is moveable in a longitudinal direction of the first guide system and wherein the slide part is moveable transversely to the longitudinal direction. A milling tool is secured on the slide part. The first and second guide systems have sliding guides or roller bearing guides. The at least one compound slide has a transverse guide system and the slide part is guided on the transverse guide system.

45 Claims, 6 Drawing Sheets

U.S. PATENT DOCUMENTS 5,313,694 A * 5/1994 Yonemoto et al. .......... 29/27 R
5,707,187 A    1/1998 Arnold
5,807,043 A * 9/1998 Blank ........................ 409/134
6,098,258 A * 8/2000 Shimomura ................. 29/27 C
6,233,810 B1   5/2001 Asbeck

FOREIGN PATENT DOCUMENTS

EP     442542 A2 *  8/1991
JP   2004-9211 A *  1/2004

* cited by examiner

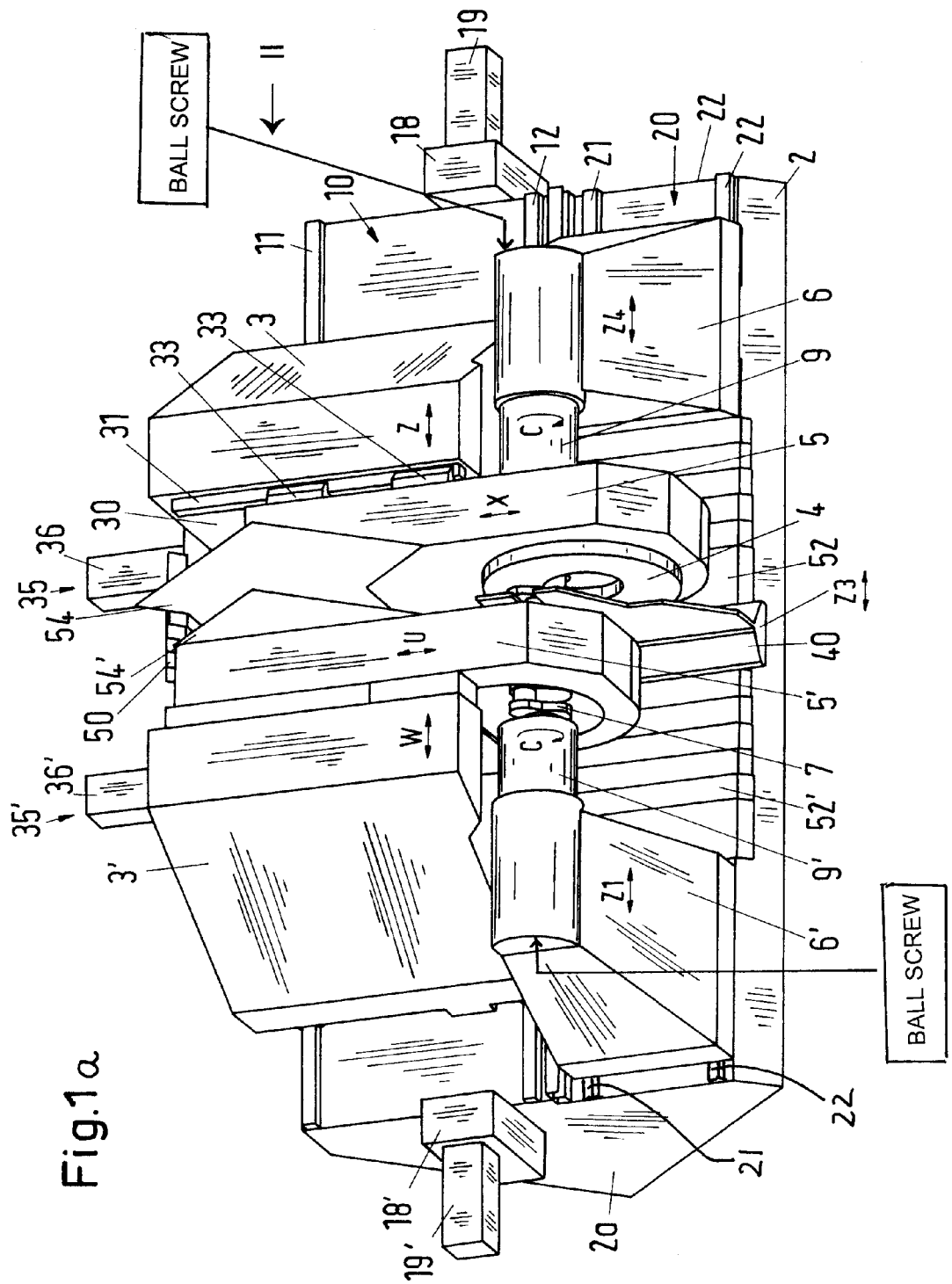

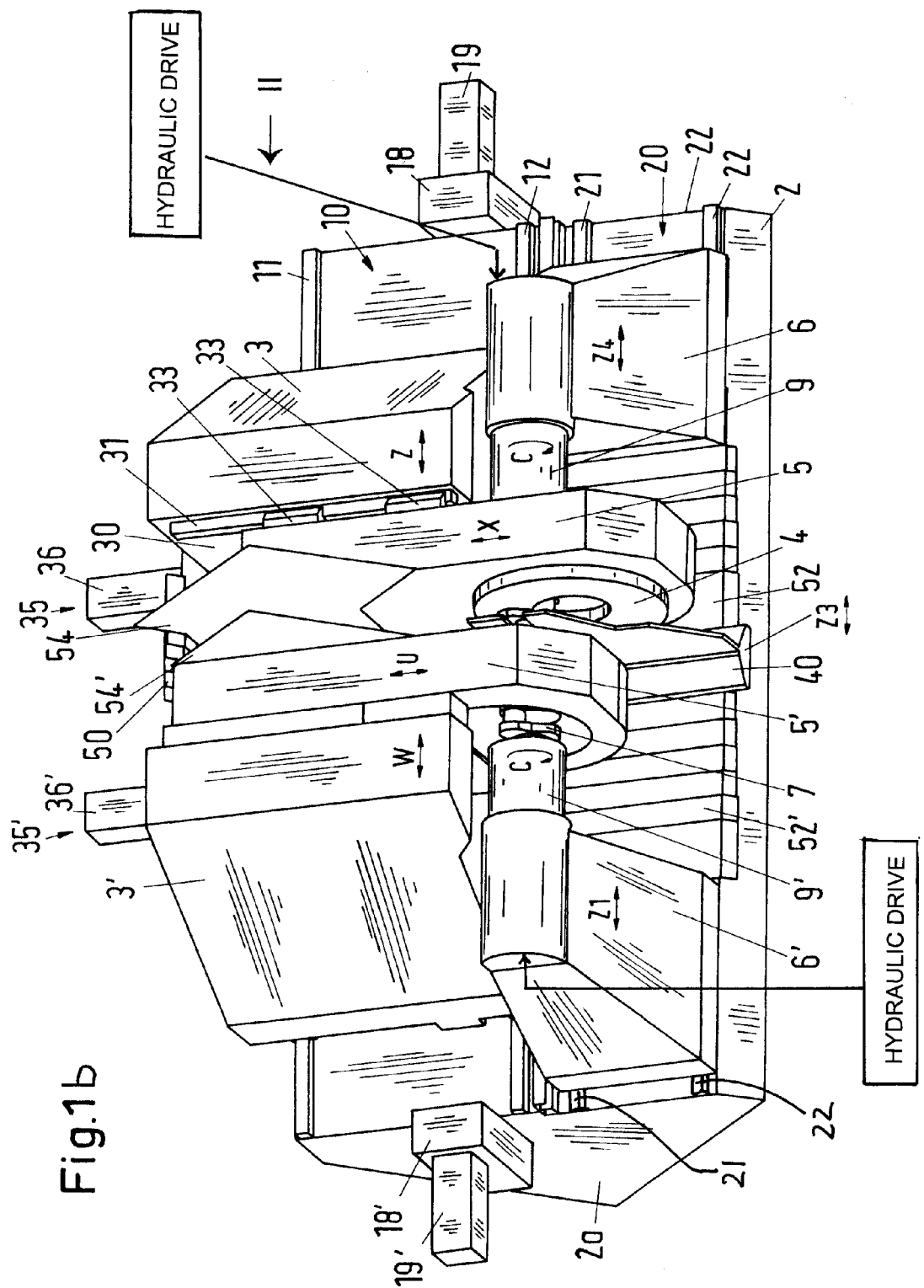

MACHINE FOR MACHINING WORKPIECES, ESPECIALLY CRANKSHAFTS AND CAMSHAFTS, WITH AT LEAST ONE INTERNAL CUTTER MILLING TOOL

BACKGROUND OF INVENTION

The invention relates to a machine for machining workpieces, especially crankshafts and camshafts, comprising at least one milling tool with internal cutter and two parallel guide systems.

The machining of crankshafts poses great requirements on the processing machines, on the tools, and cutting materials as well as the processing method. The crankshafts, because of their length and their complicated shape, are very instable. However, different surfaces of the crankshaft must be machined with high precision. The machining forces that occur during milling deform the workpiece, and this causes dimensional inaccuracy.

The machining of crankshafts is carried out, for example, on milling machines with internal cutter. The circular-cylindrical mains located on the workpiece axis are machined and, if needed, also the adjoining web surfaces, as well as the circular-cylindrical pins that are eccentric to the axis of the workpiece. U.S. Pat. No. 4,171,654 discloses a milling machine with internal cutter where a crankshaft is clamped at both ends in a headstock with a stationary chuck, respectively. The circular-cylindrical shape of the pins and mains is achieved by a circular orbital movement of the internal cutter; this is achieved by an axis interpolation of a horizontal axis and a vertical axis of the milling head. The milling unit is not movable in the direction of the workpiece axis. For machining the individual bearing locations, the headstocks are moved along guide paths to the desired position. A simultaneous machining of several bearing locations is not possible in this type of machine because only one milling unit is present. The machine configuration with milling heads that are stationary in the Z direction does not enable the simultaneous machining of two bearing locations because such a machining would require a change of the axial spacing of the milling heads.

U.S. Pat. No. 4,305,689 discloses a milling machine with internal cutter that is provided with headstocks having chucks, wherein the headstocks are movable along a guide system in the direction of the workpiece axis. The ends of the crankshafts are clamped in the chucks. They are rotatable about a numerically controlled chuck axis. The milling head that accommodates the internal cutter is provided between the headstocks and is movable along the same guide path on which the headstocks are guided in the direction of the workpiece axis. The internal cutter is additionally movable in the milling head along a vertically positioned axis. Generating a circular-cylindrical shape of the mains and pins is realized by a rotatory movement of the workpiece (axis C) and simultaneous movement of the internal cutter along its vertical axis by axis interpolation. Because of the minimal mounting space between the headstocks, the base of the guide of the milling unit must be kept short in the guiding direction. Its twisting and tilting stiffness is thus significantly reduced; this has a negative effect on the machining precision, the cutting output, the tool service live, and the surface quality. Also, the salient length of the headstocks as a result of the limited mounting space is very large; this causes an additional reduction in the stiffness. In such machine configurations, mounting of the guide path covers is also difficult. They would have to be provided between the two milling units and the headstocks. Depending on the axial movement position, the spacing between these components in an extreme situation are only a few millimeters so that a guiding path cover cannot be provided as a result of the machine configuration. This situation is even more unfavorable when a steady rest that is to be guided also on a guide path is used also. In particular in the case of mass production of crankshafts, a guide path cover is however extremely important. The absence of this component results in machine disruptions and thus in expensive down-times of the machine. Moreover, when a guide path cover is not provided, the cuttings that fall down cause a heating of the guide paths and, as a result of this, dimensional inaccuracy. Such machine configurations are therefore not suitable for precision machining. When the guide path cover is not provided, roller bearing supported linear guides cannot be used because they are very sensitive with regard to dirt particles or cuttings. When particles reach the guide shoes, this causes within a very short period of time great wear up to complete destruction.

U.S. Pat. No. 5,707,187 discloses an internal cutter milling machine where a crankshaft is clamped with both ends in the headstocks with stationary chucks. In addition, a support of the crankshaft by means of a steady rest is provided. Generating the circular cylindrical shape of the pins and mains is realized by an orbital movement of the milling head. This movement of the milling head is generated by coupling the milling unit that is supported so as to be rotatable about two pivot points to two linear actuators that act in different directions. The required axis interpolation is subject to a complicated movement law. The configuration-based large projection of the internal cutter milling machine as well as the support by means of two pivot points requires a solid, heavy construction for obtaining a satisfactory mass stiffness. For obtaining satisfactory machine dynamics, large linear actuators are required which, in turn, causes a large machine footprint. The two pivot points reduce the stiffness of the milling head so that precision machining is not possible. For the orbital movement of the milling tools, sufficient space is required in the direction toward the guide system so that the height of centers of the headstock is relatively large. In this way, the stiffness of the headstocks is reduced enormously for machines of such a configuration. Moreover, the attachment of the guide path covers is possible in this machine only at great expenditure because of the orbital movement of the milling heads and of the pivot points of the milling head suspension.

SUMMARY OF INVENTION

It is an object of the invention to configure the machine of the aforementioned kind such that the workpieces can be machined at high machining precision in a simple and proper way even though the machine has a compact configuration.

This object is solved according to the invention for the machines of the aforementioned kind in that the milling tool is secured on a slide part of a compound slide that is movable in a longitudinal direction of the guide system and wherein the slide part is movable transversely to the guide system.

In the machine according to the invention, the tool is secured on the slide part of the compound slide. It is moved along the correlated guide system while the slide part with the tool is movable transversely to this guide system. Advantageously, the machine according to the invention has two headstocks and optionally steady rests. For the tool side as well as the workpiece side of the machine, the two parallel guide systems are provided that extend in the Z direction. One of the guide systems is provided for the compound slide having the slide part while the other guide system is correlated with the headstocks as well as, optionally, the steady rest. The tool can be moved by means of the slide part transversely to the workpiece axis. The workpieces to be machined, especially, crankshafts and camshafts, are clamped within the chucks so as to be rotationally movable (axis C). Producing the circular-cylindrical bearing locations is realized by axis interpolation between the slide part and the C axis. By means of the separate guide systems for the compound slide and the headstocks/steady rests, respectively, the guide base of each individual component assembly can be sized to be sufficiently large so that a high twisting and bending stiffness results. Because of the separate guide systems, the headstocks in the machine according to the invention can be configured with minimal chuck projection so that the workpiece can be clamped with very high stiffness. This configuration of the compound slide and of the head-stocks/steady rests results in very high machining precision. Moreover, the vibration and chatter tendencies are reduced. This results in advantages such as higher machining precision, higher process safety, long tool service life, and higher cutting output etc.

As a result of the separate guide systems, it is advantageously possible to provide guide path covers that prevent reliably the penetration of cuttings but still have a simple configuration. The wear of guide path strippers is greatly reduced and the guide paths themselves are no longer exposed to the cuttings that strike at high velocity. In this way, the reliability and thus the machine availability is increased. Moreover, temperature constancy is increased because the cuttings can no longer heat the guide paths. In the case of mass production, it is therefore possible to provide a high machining reliability. Because of the guide path covers, it is now also possible to use roller bearing supported guide systems. In comparison to slide bearings, roller bearings are sensitive with regard to penetration of particles such as cuttings; however, they have several advantages. They can be simply and quickly mounted, have a reduced slide resistance, and enable high quick traverse speeds while causing minimal heating. In comparison to a sliding guide action, no stick-slip effect occurs. The precision is very high because of the pretension of the bearing. Moreover, as a result of the arrangement of the milling unit on a separate guide system, the accessibility of the working space of the machine is significantly improved.

BRIEF DESCRIPTION OF DRAWINGS

FIG. 1 is a perspective illustration, in a view from the top at a slant downwardly, of the machine tool of the present invention for workpiece milling with an internal cutter.

FIG. 1*a* is a perspective illustration analog to FIG. 1 showing schematically ball screws acting as drives on the headstocks.

FIG. 1*b* is a perspective illustration analog to FIG. 1 showing schematically hydraulic drives acting as drives on the headstocks.

DETAILED DESCRIPTION

Figure 2:
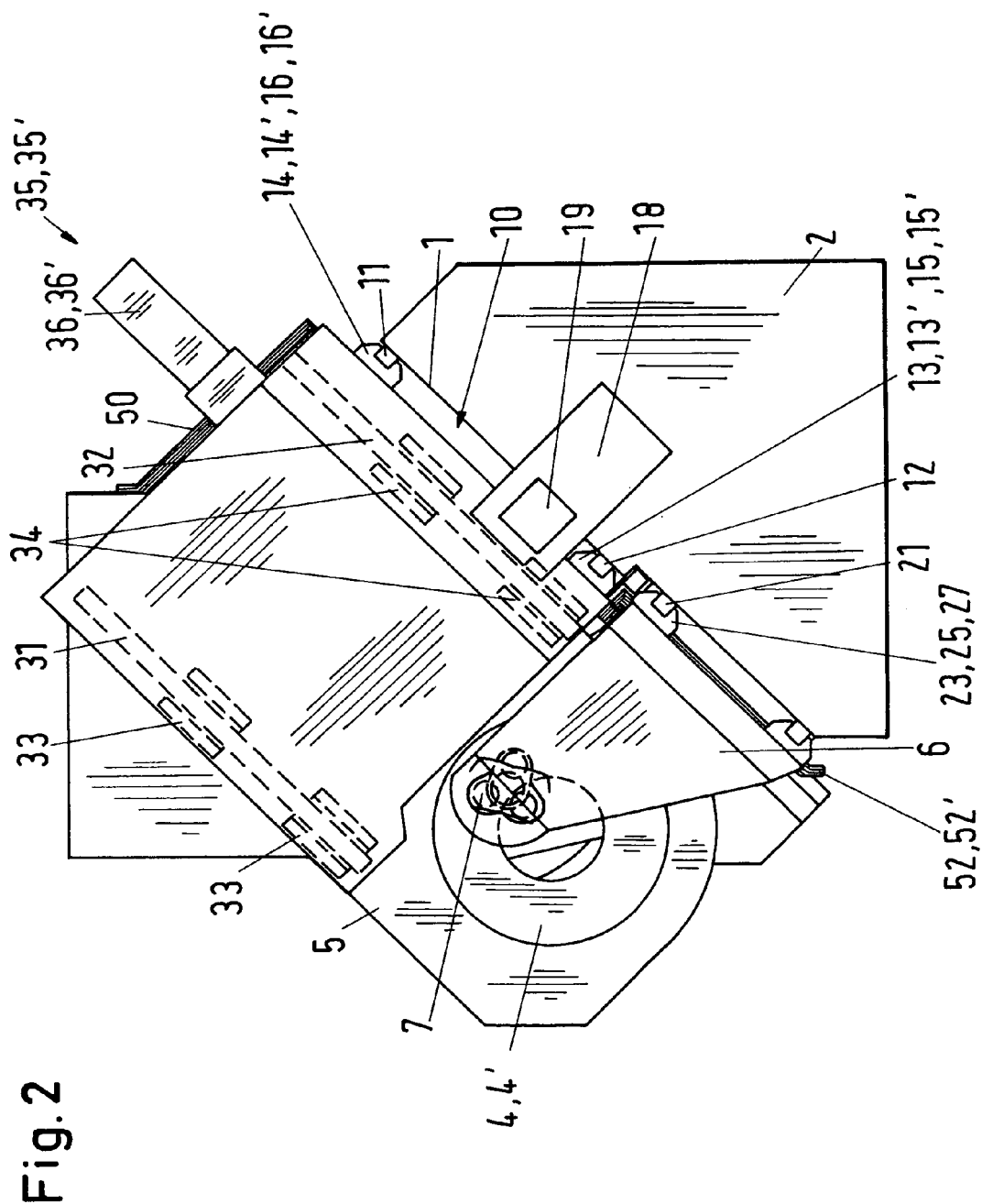
FIG. 2 is a view in the direction of arrow II of FIG. 1.

The machine tool with internal cutter for milling workpieces comprises a machine frame 2 that is provided with an inclined contact side 1 (FIG. 2). On the machine frame 2, two compound slides 3, 3' are movably supported. They are positioned opposite one another at a spacing at the same level. The two compound slides 3, 3' each support a slide part in the form of a milling unit 5, 5'. In the area adjacent to the compound slides 3, 3', two headstocks 6, 6' are provided on the machine frame 2 for clamping the workpiece 7 to be machined. Also provided is a steady rest 40 that is located in the area between the headstocks 6, 6' and supports, as is known in the art, the workpiece 7 during machining. The machine frame 2 is of an inclined bed configuration and can be made of steel, can be cast, or made as a concrete structure. On the inclined side 1, a guide system 10 is provided in the upper area that can be a sliding guide but is preferably configured as a roller bearing guide. The guide system 10 has two parallel extending guide rails 11, 12 that are fastened on the inclined side 1 and on which guide shoes 13–16, 13'–16' are supported. The guide shoes are fastened on the compound slides 3, 3' that are movably supported by means of the guide shoes on the two guide rails 11, 12. Each of the compound slides 3, 3' is supported with guide shoes 14, 16; 13, 15; 14', 16'; 13', 15' on the guide rails 11, 12, respectively, wherein two of the guide shoes are positioned at a spacing sequentially behind one another along the rail. In this way, the compound slides 3, 3' are supported reliably on the guide rails 11, 12. The guide shoes 13–16, 13'–16' are configured as is known in the art.

The compound slides 3, 3' support the milling units 5, 5' that are movably supported on the compound slides 3, 3' in a direction transverse to the travel direction of the compound slides 3, 3'. The compound slides 3, 3' are separately movable in the W direction and the Z direction along the guide rails 11, 12. Since the two compound slides 3, 3' are provided on the underside with four guide shoes 13–16, 13'–16', respectively, that are spaced apart in the moving direction W or Z and also transversely thereto at a great spacing relative to one another, a guide base is provided that is very bending-resistant and torsion-proof. In this way, the conditions for precise machining of the workpieces 7 are created. For increasing the stiffness, additional guide shoes can be provided on the underside of the compound slides 3, 3'. For example, each compound slide 3, 3' can have six guide shoes.

For driving the compound slides 3, 3' in the directions W and Z, the drives 18, 18' are provided that are located on the end faces 2*a*, 2*b* of the machine frame 2 that are facing away from one another. The drives 18, 18' have drive motors 19, 19'. The force transmission is realized, as is known in the art, by ball screws (not illustrated).

The drives for moving the compound slides 3, 3' in the W and Z directions can also be realized by linear motors.

The compound slides 3, 3' are provided at their facing sides with a transverse guide system 30, 30', respectively, with which the milling units 5, 5' are arranged to be movable transversely to the directions W and Z on the compound slides 3, 3'. The transverse guide systems 30, 30' each have two parallel extending guide rails 31, 32; 31', 32' that are positioned at a spacing to one another atop one another and extend at a slant in accordance with the inclined support side 1 of the machine frame 2 (FIG. 2). On the guide rails 31, 32;

31', 32', the milling units 5, 5' are mounted with two guide shoes 33, 34; 33', 34', respectively. As illustrated in FIG. 2, the guide shoes correlated with each guide rail 31, 32; 31', 32', respectively, are positioned at a spacing from one another.

Figure 1C:
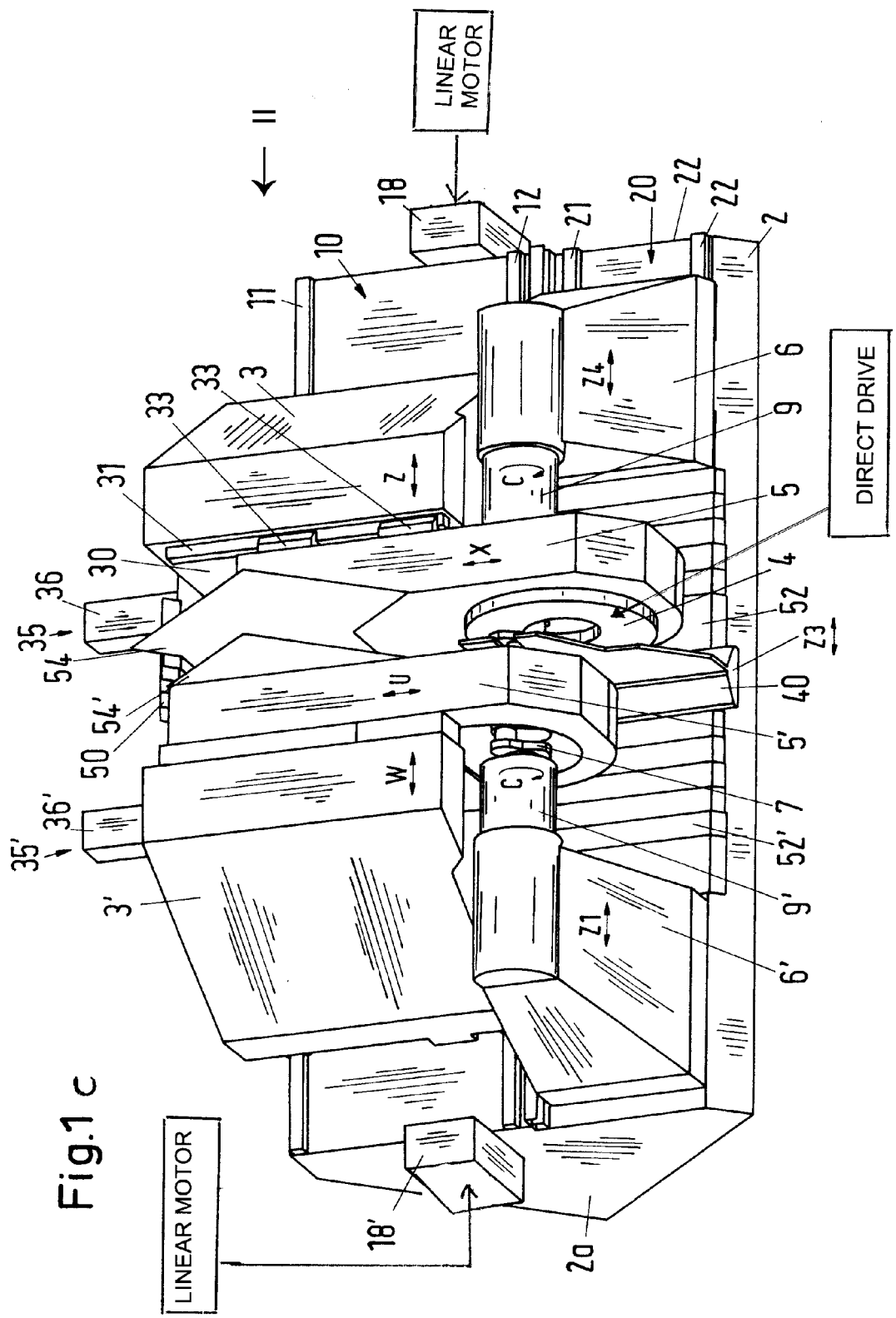
FIG. 1*c* is a perspective illustration analog to FIG. 1 showing schematically linear motors for driving the compound slides.
Figure 3:
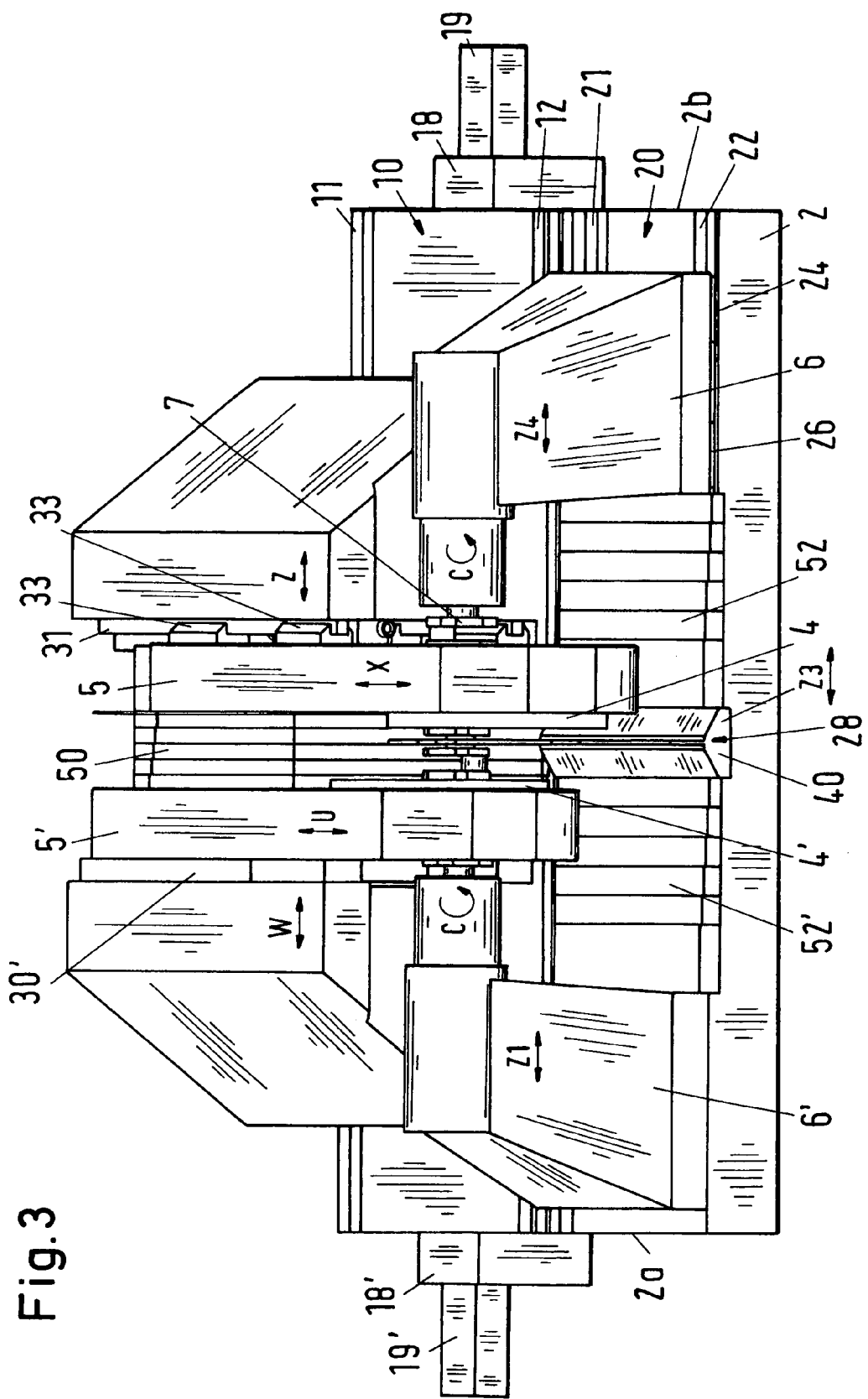
FIG. 3 shows the machine tool according to the invention in a front view.
Figure 4:
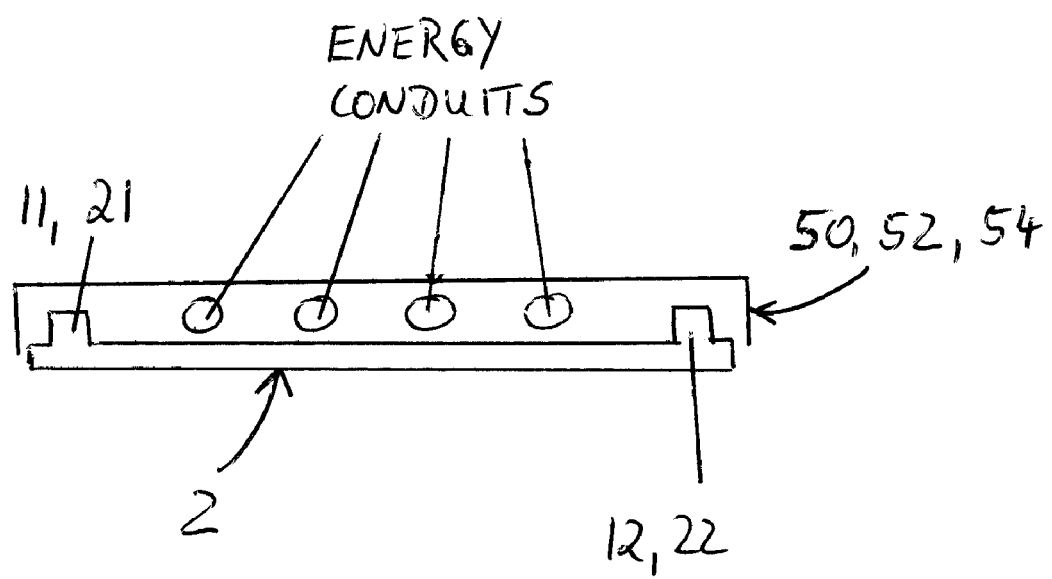
FIG. 4 shows schematically energy conduits arranged between the guide rails underneath the protective cover.

For driving the milling units 5, 5', the drives 35, 35' with drive motors 36, 36' are provided. The drives 35, 35' with the drive motors 36, 36' are provided on the side of the compound slides 3, 3' (FIGS. 1 and 3) facing away from the headstocks 6, 6'. The drive connection to the milling units 5, 5' is realized, as is known in the art, by ball screws (not illustrated). As an alternative, advancing drives with linear motors can also be used. In comparison to drives with ball screw, such linear drives have higher dynamics and are wear-free. The higher dynamics enable in particular fast in-process dimensional corrections where dimensional deviations that are measured during machining of the workpiece 7 effect corrective movements on the advancing axes X or U or C. The milling units 5, 5' can be moved by means of the drives 35, 35' along the guide rails 31, 32; 31', 32' in the U direction and the X direction (FIG. 1), respectively.

On the ends of the milling units 5, 5' facing the headstocks 6, 6', the internal cutter milling tools 4, 4' are positioned. They are driven in rotation in a conventional way by externally mounted motors and gears. Instead of such a drive, it is also possible to provide a direct drive for the tools 4, 4' for example, a quill motor or a torque motor. Such a drive requires only minimal mounting space because the external motor and the gearbox required for conventional drives are obsolete. The direct drives have moreover higher dynamics so that the high-dynamics vibration excitation during cutting of the workpiece 7 can be controlled directly at the force introducing location. By measuring the provided motor output, the wear state of the cutting edges of the tools 4, 4' can be determined with great precision. In contrast to conventional drives, the motor current measurements are therefore not falsified by the power loss of a gearbox. By measuring the cutting output by means of the motor current, an adaptation of the advancing speed and/or of the cutting speed in the sense of in adaptive control is possible so that cutting is carried out always under optimal cutting conditions. In particular, the cutting speed can be very quickly changed by means of the direct drive as a result of the minimal mass moment of inertia during machining. For example, a doubling of the cutting speed within 0.5 seconds is possible. Running of the milling tools 4, 4' exhibits very little vibrations as a result of the absence of a gearbox in the case of direct drives so that a high surface quality is obtained and the service life of the tool can be improved. The milling tools 4, 4' are driven in rotation.

Because of the high stiffness of the compound slides 3, 3', as well as of the milling units 5, 5', it is possible to employ gang cutters. With these tools, several bearing locations of crankshafts or camshafts or cams of camshafts are simultaneously machined with one milling unit.

The guide system 10 for the compound slides 3, 3' is located within the upper area of the inclined side 1 of the machine frame 2. In the lower area of the inclined side 1 of the machine frame 2 an additional guide system 20 is provided that has two parallel extending guide rails 21, 22 that are parallel to the guide rails 11, 12 of the guide system 10. In contrast to the guide system 10 whose guide rails 11, 12 extend across the entire length of the machine frame 2, the guide rails 21, 22 of the guide system 20 extend only across a portion of the length of the machine frame 2. Accordingly, in the illustrated embodiment only the headstock 6 is movable along the guide system 20 in the direction of the Z4 axis. The opposed headstock 6' is in this case arranged stationarily on the machine frame 2. Accordingly, this headstock 6' cannot be moved in the direction of the axis Z1. It is, of course, possible to configure only the headstock 6' to be movable and to fasten the headstock 6 on the machine frame 2. In this case, the guide system 20 is provided in the area of the headstock 6'.

Also, it is possible to provide the guide system 20 across the entire length of the machine frame 2. In this case, both headstocks 6, 6' can be adjusted in the direction of the axis Z1 or Z4 on the machine frame 2.

In the illustrated embodiment where only the headstock 6 is movable, four guide shoes 23 to 26 are attached on the underside of the headstock 6; by means of the guide shoes the headstock 6 is mounted on the guide rails 21, 22. The headstock 6 is supported with two guide shoes 23, 25; 24, 26 on each guide rail 21, 22, respectively, wherein the guide shoes are positioned at a spacing relative to one another along the guide rail. The drive of the headstock 6 in the direction Z4 is realized by a ball screw (not illustrated) or by means of a hydraulic drive. The headstock 6 can be configured such that it is entrained by the steady rest 40. The steady rest 40 is supported on the two guide rails 21, 22 by means of a guide shoe 27, 28, respectively. The drive of the steady rest 40 in this case is also realized advantageously by means of the ball screws (not illustrated). When the headstock 6 is designed to be entrained by the steady rest 40, the headstock 6 is provided with clamping shoes that, upon reaching a nominal position, provide a safe locking function on the guide rails 21, 22 by a clamping action even during machining of the workpiece 7.

The task of the steady rest 40 is to secure the workpiece axis during machining in its nominal position. By processing forces and/or release of internal stress, a displacement of the workpiece axis would result if no steady rest were used. Two situations of use can be differentiated:

steady rests that support the workpiece on already machined surfaces do not require compensation elements;

steady rests that support the workpiece on a rough contour require compensation elements, i.e., the support elements are arranged to be movable such that they can compensate irregular workpiece contours.

Since the four guide shoes 23, 26 on the underside of the headstock 6 are positioned at a great spacing relative to one another in the movement direction (axis Z4) and transversely thereto, the headstock 6 has a stable guide base with a high bending and torsional stiffness. In this way, an optimal precision machining of the workpiece 7 is possible.

The two headstocks 6, 6' are provided at their facing sides with a chuck 9, 9', respectively, with which the workpiece 7 is clamped during machining. The chucks 9, 9' are rotatable and form the numerically controlled axis C.

The workpiece 7, for example, a crankshaft or a camshaft, is securely clamped at both ends in the chucks 9, 9'. Machining of the circular-cylindrical bearing locations of the workpiece 7 by means of the internal cutters 4, 4' is realized by axis interpolation of the linear axes X or U (FIG. 1) with the axis C.

Since the compound slides 3, 3' are guided on separate guide paths, the projection of the headstocks 6, 6' can be maintained at a minimum. In this way, the headstocks 6, 6' are provided with a high stiffness.

The steady rest 40 is advantageously used when the workpiece to be machined is long and thus instable. The steady rest 40 can be moved along the guide system 20 by means of its two guide shoes 27, 28 by a ball screw (not illustrated) into the required position. For increasing the stiffness of the steady rest 40, additional guide shoes can be used. For example, the steady rest 40 can be supported, for example, by three or four guide shoes on the guide rails 21, 22. For particularly long or instable workpieces 7, additional steady rests can be provided. They can be configured identically to the steady rest 40. Because of the sufficient space that is available between the compound slides 3, 3', it is also possible to use workpiece rests that are fixedly connected to the compound slides 3, 3'.

It is particularly advantageous when the guide systems 10, 30 are in the form of a roller bearing guide and the guide system 20 is a sliding guide. As a result of the minimum movement frequency of the headstock 6, 6' and of the steady rest 40, even when using sliding guides only minimal friction heat will result. Of course, all combinations of roller bearing guides or slide bearing guides can be used as guide systems 10, 20, 30. In the case of sliding guides, especially the material pairs steel/cast iron, steel/plastic material or cast iron/plastic material are suitable in order to obtain high precision, a long service life, and minimal stick-slip effects. These guide systems are based on the hydrodynamic principle. A further advantageous configuration of a sliding bearing is a hydrostatic bearing. Particularly advantageous in this connection is the minimal friction as well as the absence of the stick-slip effect.

For protecting the guide systems 10, 20, 30 against penetration of cuttings and cooling lubricants, guide path covers 50, 52, 52', 54, 54' are provided. Since between the component assemblies mounted on the guide systems 10, 20, 30 there is sufficient space available, the covers can be advantageously configured as telescoping covers. Because of the presence of the covers 50, 52, 52', 54, 54', it is possible to provide energy conduits for the components in a simple way between the guide rails 11, 12; 21, 22 and underneath the covers. In this way, the steady rest 40 can be supplied with electricity, hydraulic fluid, pneumatic fluid and the like without introducing hollow spaces into the machine frame 2. The cross-section of the machine frame 2 must not be weakened; this is advantageous with regard to the stiffness of the entire machine tool. Installation of the energy conduit is moreover possible in a very simple way.

In the machine tool according to the illustrated embodiment, the machine frame 2 has an inclined bed configuration. Of course, the machine frame can also have any other suitable configuration. For example, the contact side 1 can be arranged horizontally.

While specific embodiments of the invention have been shown and described in detail to illustrate the inventive principles, it will be understood that the invention may be embodied otherwise without departing from such principles.

The invention claimed is:

1. A machine for machining workpieces, the machine comprising:
  at least one milling tool with an internal milling cutter having a milling opening surrounding a workpiece for milling an outer surface of a workpiece;
  a first guide system including at least two parallel guide rails;
  a second guide system parallel to, outside of, and spaced from the first guide system;
  wherein the first guide system comprises at least one compound slide having a slide part, wherein the at least one compound slide is moveable in a longitudinal direction of the first guide system and wherein the slide part is moveable transversely to the longitudinal direction on linear axis X;
  the at least one milling tool being secured on the slide part;
  wherein the second guide system comprises a chuck for receiving a workpiece, the chuck having an axis of rotation about which a workpiece received in the chuck is rotatable;
  wherein machining of a workpiece received in the chuck by the at least one milling tool is carried out by axis interpolation of the linear axis X and the axis of rotation of the chuck.

2. The machine according to claim 1, wherein the first and second guide systems have sliding guides.

3. The machine according to claim 1, wherein the first and second guide systems have roller bearing guides.

4. The machine according to claim 1, wherein the at least one compound slide has a transverse guide system and wherein the slide part is guided on the transverse guide system.

5. The machine according to claim 1, wherein the slide part is a milling unit.

6. The machine part according to claim 1, further comprising at least one head stock supported on the second guide system in an area adjacent to the at least one compound slide.

7. The machine part according to claim 1, further comprising at least one steady rest supported on the second guide system in an area adjacent to the at least one compound slide.

8. The machine part according to claim 1, wherein the second guide has at least two parallel extending guide rails.

9. The machine according to claim 8, wherein the at least one compound slide has at least two guide shoes engaging the at least two guide rails of the first guide system.

10. The machine according to claim 8, wherein the at least one compound slide has two guide shoes positioned at a spacing to one another, respectively, for engaging each one of the guide rails of the first guide system.

11. The machine according to claim 8, further comprising at least one head stock supported on the second guide system in an area adjacent to the at least one compound slide, wherein the at least one head stock has at least one guide shoe engaging the guide rails of the second guide system.

12. The machine according to claim 11, wherein the at least one head stock has two of the guide shoes positioned at a spacing to one another on each one of the guide rails of the second guide system, respectively.

13. The machine according to claim 8, further comprising at least one steady rest supported on the second guide system in an area adjacent to the at least one compound slide, wherein the at least one steady rest has at least one guide shoe engaging the guide rails of the second guide system.

14. The machine according to claim 1, wherein the first guide system has two of the at least one compound slide.

15. The machine according to claim 14, wherein the two compound slides are movable independently from one another along the first guide system.

16. The machine according to claim 1, wherein the at least one compound slide has an advancing drive.

17. The machine according to claim 16, wherein the advancing drive is a ball screw or a linear motor.

18. The machine according to claim 1, further comprising at least one head stock supported on the second guide system in an area adjacent to the at least one compound slide, wherein the at least one headstock has an advancing drive.

19. The machine according to claim 18, wherein the advancing drive of the head stock is a hydraulic drive or a ball screw.

20. The machine according to claim 1, further comprising two head stocks, wherein a first one of the head stocks is fixedly attached to a machine frame of the machine.

21. The machine according to claim 1, further comprising two head stocks supported on the second guide system.

22. The machine according to claim 21, wherein the two head stocks are drivable independently from one another.

23. The machine according to claim 1, further comprising two headstocks fastened on a machine frame of the machine.

24. The machine according to claim 1, further comprising at least one head stock having the chuck.

25. The machine according to claim 24, wherein the chuck is drivable about an axis of rotation.

26. The machine according to claim 1 wherein the first guide system has two of the at least one compound slide, wherein the compound slides each have a transverse guide system for guiding the slide part, respectively.

27. The machine according to claim 26, wherein the transverse guide systems are provided on sides of the compound slides that are facing one another.

28. The machine according to claim 1, wherein the slide part has a projecting end that projects in the transverse direction past the at least one compound slide in a direction of a headstock of the machine.

29. The machine according to claim 28, wherein the projecting end supports the at least one milling tool.

30. The machine according to claim 1, wherein the at least one milling tool has a direct drive.

31. The machine according to claim 1, wherein the first and second guide systems have guide rails that are at least partially positioned underneath a cover.

32. The machine according to claim 31, wherein the cover is a telescoping cover.

33. The machine according to claim 31, further comprising energy conduits arranged underneath the cover.

34. The machine according to claim 33, wherein the energy conduits extend between the guide rails of the first and second guide systems.

35. The machine according to claim 1, comprising a machine frame having an inclined bed configuration having an inclined side inclined relative to a horizontal plane.

36. The machine according to claim 35, wherein the first and second guide systems are arranged on the inclined side of the machine frame.

37. The machine according to claim 1, wherein the first guide system has two of the at least one compound slide, said two of the at least one compound slide each being guided on said two parallel guide rails.

38. The machine according to claim 37, further comprising a steady rest arranged on the second guide system, the steady rest having a drive for moving the steady rest on the second guide system.

39. The machine according to claim 38, further comprising:
   telescoping guide path covers for protecting the first and second guide systems; and
   energy conduits arranged underneath the telescoping guide path covers.

40. The machine according to claim 1, further comprising a steady rest arranged on the second guide system, the steady rest having a drive for moving the steady rest on the second guide system.

41. The machine according to claim 1, further comprising:
   telescoping guide path covers for protecting the first and second guide systems; and
   energy conduits arranged underneath the telescoping guide path covers.

42. A machine for machining workpieces, the machine comprising:
   at least one milling tool with an internal milling cutter having a milling opening surrounding a workpiece for milling an outer surface of a workpiece;
   a first guide system including at least two parallel guide rails;
   a second guide system parallel to, outside of, and spaced apart from the first guide system;
   wherein the first guide system comprises at least one compound slide having a slide part, wherein the at least one compound slide is moveable in a longitudinal direction of the first guide system and wherein the slide part is moveable transversely to the longitudinal direction;
   the at least one milling tool being secured on the slide part;
   a steady rest arranged on the second guide system, the steady rest having a drive for moving the steady rest on the second guide system.

43. The machine according to claim 42, further comprising:
   telescoping guide path covers for protecting the first and second guide systems; and
   energy conduits arranged underneath the telescoping guide path covers.

44. A machine for machining workpieces, the machine comprising:
   at least one milling tool with an internal milling cutter having a milling opening surrounding a workpiece for milling an outer surface of a workpiece;
   a first guide system;
   a second guide system parallel to and spaced apart from to the first guide system;
   wherein the first guide system comprises at least one compound slide having a slide part, wherein the at least one compound slide is moveable in a longitudinal direction of the first guide system and wherein the slide part is moveable transversely to the longitudinal direction;
   the at least one milling tool being secured on the slide part;
   telescoping guide path covers for protecting the first and second guide systems;
   energy conduits arranged underneath the telescoping guide path covers.

45. The machine according to claim 44, wherein the first guide system has two parallel guide rails and wherein the first guide system has two of the at least one compound slide, said two of the at least one compound slide each being guided on said two parallel guide rails.

* * * * *